US00H002076H

(19) United States

(12) Statutory Invention Registration

Watson et al.

(10) Reg. No.: US H2076 H

(43) Published: Aug. 5, 2003

(54) ANALOG VIDEO PROCESSOR

(75) Inventors: Greg A. Watson, Ridgecrest, CA (US); Richard C. St. Clair, Ridgecrest, CA (US); Steven C. Tenbrink, Los Alamos, NM (US)

(73) Assignee: The United States of America as represented by the Secretary of the Navy, Washington, DC (US)

(21) Appl. No.: 06/835,816

(22) Filed: Jan. 27, 1986

(51) Int. Cl.[7] ..... G06K 9/00; G08B 13/196

(52) U.S. Cl. ..... 382/103; 340/567

(58) Field of Search ..... 382/22; 358/125, 358/126

(56) References Cited

U.S. PATENT DOCUMENTS

| | | | | |
|---|---|---|---|---|
| 3,507,991 A | | 4/1970 | Scotchie et al. | |
| 3,586,770 A | | 6/1971 | Bonebreak | |
| 3,714,373 A | | 1/1973 | Kuhn | |
| 3,988,534 A | | 10/1976 | Sacks | |
| 4,037,254 A | | 7/1977 | Monahan | |
| 4,316,218 A | | 2/1982 | Gay | |
| 4,396,903 A | * | 8/1983 | Habicht et al. | 382/22 |
| 4,430,673 A | * | 2/1984 | Salomon et al. | 358/125 |
| 4,433,438 A | * | 2/1984 | Couturier | 382/22 |

* cited by examiner

*Primary Examiner*—Daniel T. Pihulic

(74) *Attorney, Agent, or Firm*—William C. Townsend; W. Thom Skeer

(57) ABSTRACT

An analog video processor is disclosed for coupling a CCD target acquisition and tracking seeker to a microcomputer via a video preprocessor, having a CCD automatic light control circuit, a video automatic gain control circuit, and a TV monitor/display circuit, and via a video processor, having a target acquisition mode gradient processor circuit, to detect target edge sharpness, a target tracking mode contrast processor circuit to detect targets via video amplitude, and an output control circuit, to convert analog and asynchronous target signatures to synchronous target edges for input to the microcomputer.

1 Claim, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

101
Monitor Video Out
Tracker Video
Delayed Vertical Sync
Automatic Light Control Motor Drive
QUAD SPST SWITCH
FLIP FLOP
Crosshair + Edge
Video
Automatic Gain Control
Automatic Light Control Rate Feedback
Vertical Sync Buffered
Composite Blank

ANALOG VIDEO PROCESSOR

BACKGROUND OF THE INVENTION GROUP

1. Field of the Invention

The invention relates to the field of electronics. More specifically, the invention lies in the area of analog/digital real time seeker processing circuits utilizing imaging capabilities of a charge coupled device (CCD) array in combination with the computing power of a microcomputer ($\mu$C).

2. Description of the Prior Art

Before the development of CCDs, microprocessors, and microcomputers, imaging systems for short-range air-to-air missile applications were impractical. Prior to the development of CCD arrays, real-time imaging systems for larger weapons were implemented with television vidicons. Vidicons were constructed of glass tubes, which were excessively bulky for use on gimballed seeker platforms small enough for short-range air-to-air missiles. The advent of the $\mu$C also greatly reduced the volume required for the acquisition/tracking electronics. The combination of these two technological advances permitted the packing of both the imaging system and associated acquisition/tracking electronics within a sufficiently small airframe volume.

A missile incorporating these two technologies requires circuitry designed to interface the CCD imaging-system to the imbedded $\mu$C-based controller. Specialized video processing techniques are therefore needed to satisfy the required target acquisition ranges for certain types of missiles. Circuitry in the analog video processor disclosed herein optimizes CCD video by use of automatic light control (ALC) and automatic gain control (AGC) systems. Other specialized circuitry of the invention minimizes the synchronous noise inherent in CCD video and extracts targets with sharp edges, which generally indicate man-made objects.

There exists therefore a continuing need for the analog video processor described herein that can efficiently couple a CCD array to a $\mu$C acquisition and tracking system.

SUMMARY OF THE INVENTION

The invention is a CCD seeker analog video processor having a video preprocessor (VPP) and video processor (VP) circuits cou-pling a $\mu$C to a CCD camera and video monitor. The invention is capable of real time tracking and display of a target in white and black images. With the exception of the video monitor, all of these modules were designed for packaging in the small airframe -of a short-range air-to-air missile. The VPP consists of an ALC circuit that controls light to the CCD array, an AGC circuit that controls video signal amplitude, and a display (DP) circuit that provides a video signal to a video monitor. The VPP presents useful video from the CCD camera to the VP for further processing by controlling video signal amplitude and the CCD array exposure to light, and further provides a video image of the scene the CCD seeker is viewing and tracking. The VP consists of. a gradient processor (GP) circuit that detects potential targets with best edges, i.e. edges containing the highest spatial frequency components within the field of view. Because man-made objects (targets) have sharper edges, a contrast: processor (CP) circuit that detects targets as a function of signal amplitude by sampling and subtracting background on either side of a potential target, and an output control (OC) circuit that converts four asynchronous pulse signals from the CP and GP circuits to signal formats that are detectable by synchronous means at the input of $\mu$C for input to the $\mu$C. The VP converts analog signals to a digital format that is acceptable for the microcomputer to discern-and track a target.

OBJECTS OF THE INVENTION

It is therefore a primary object of the invention to couple a CCD seeker array to $\mu$C for acquisition and tracking of a target.

Another object of the invention is to incorporate a feedback CCD camera iris control to regulate the amount of light impinging on a CCD array.

Yet another object of the invention is to regulate the amplitude of the CCD camera video signal to be processed.

A further object-is to provide for a video monitor displaying the field of view of the CCD camera.

Yet another object is extract from the CCD video signal a best edge function, those edges containing the highest spatial frequency components within the field of view to detect potential targets via gradient signatures, i.e. higher frequencies indicate sharper edges which probably indicate man-made objects.

Yet a further object of the invention is to detect a target as a function of video signal amplitude via a contrast signature.

Yet a another object of the invention is to convert gradient and contrast asynchronous digital target signals to synchronous digital target signal edges for input to a microcomputer.

These and further objects and more advantageous features will become more readily apparent in view of the attached drawing, the accompanying specification and the appended claims.

DESCRIPTION OF THE PREFERRED EMBODIMENT

Figure 1:
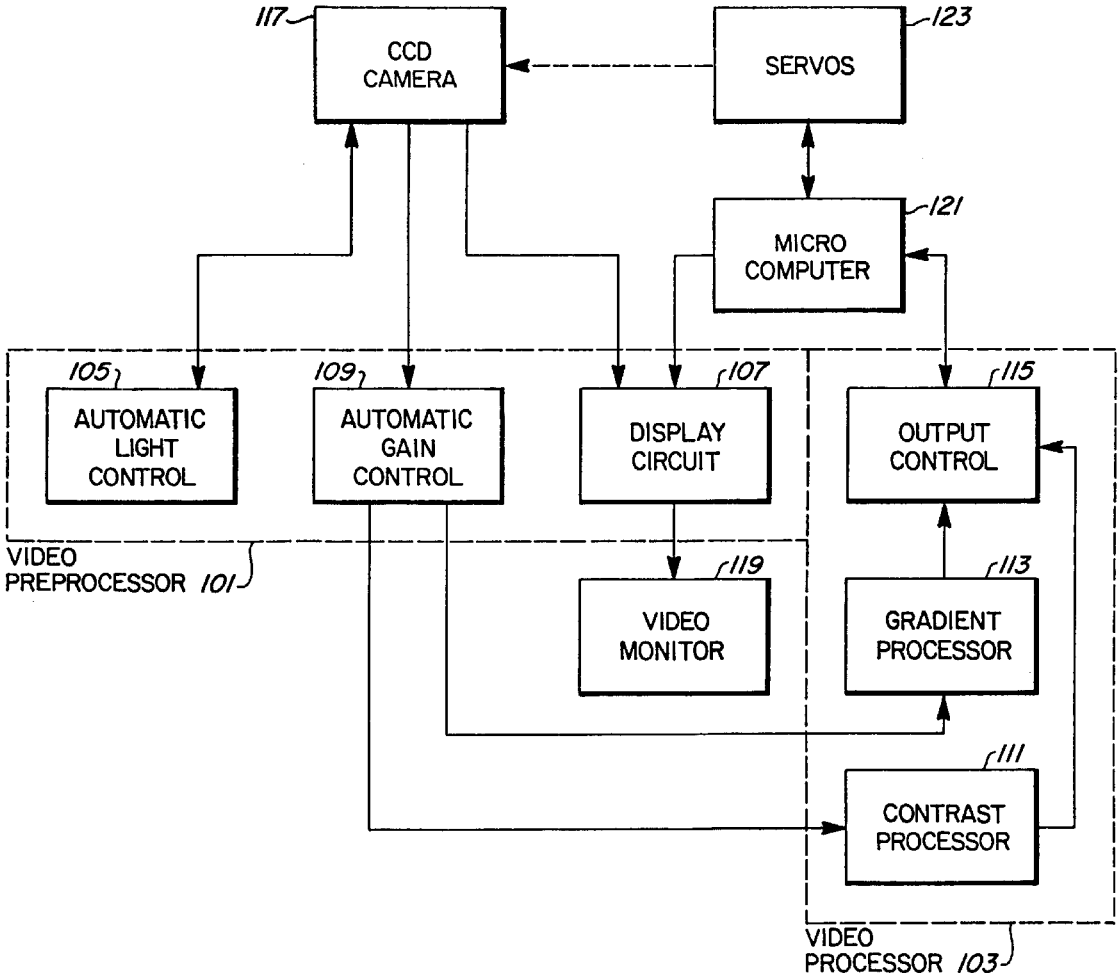
FIG. 1 is an overview of the analog video processor invention and thenvironment in which it is used.

Referring to FIG. 1, an overview of the invention and the system in which it is used is illustrated. As indicated in FIG. 1 by dashed boxes, the analog video processor invention consists of a video preprocessor (VPP) board 101 and a video processor (VP) board 103. VPP board 101 contains an automatic light control (ALC) circuit 105, a display circuit (DP) 107 and an automatic gain control (AGC) circuit 109. VP board 103 contains a contrast processor (CP) circuit 111, a gradient processor (GP) circuit 113, and an output control circuit 115.

VPP 101 and VP 103 circuits function together to perform high speed real time/analog processing of a video from charge coupled device (CCD) camera 117 to allow a microcomputer ($\mu$C) 121 to further process the same functions/signals at a lower bandwidth, but real time/digital environment. $\mu$C 121 in turn provides control feedback to VPP 101 and VP 103, and to servo motors 123 which control CCD camera 117 platform.

ALC circuit 105 is coupled to and controls an iris of a lens leading to the CCD array of CCD camera 117. CCD camera 117 in turn is coupled to and provides inputs to ALC 105, DP 107, and AGC 109 circuits. DP circuit 107 provides an input to a video monitor (VM) 119 to give a visual image of what CCD camera 117 is viewing. AGC circuit 109 of VPP circuit 101 yields inputs to CP 111 and GP 113 circuits of VP 103 and in turn is operated upon by GP circuit 103. CP 111 and GP 113 circuits yield inputs to OC circuit 115 which in turn provides an input to $\mu$C 121. $\mu$C 121 receives feedback input from servo motors 123 which control the orientation of CCD camera 117.

Figure 2:
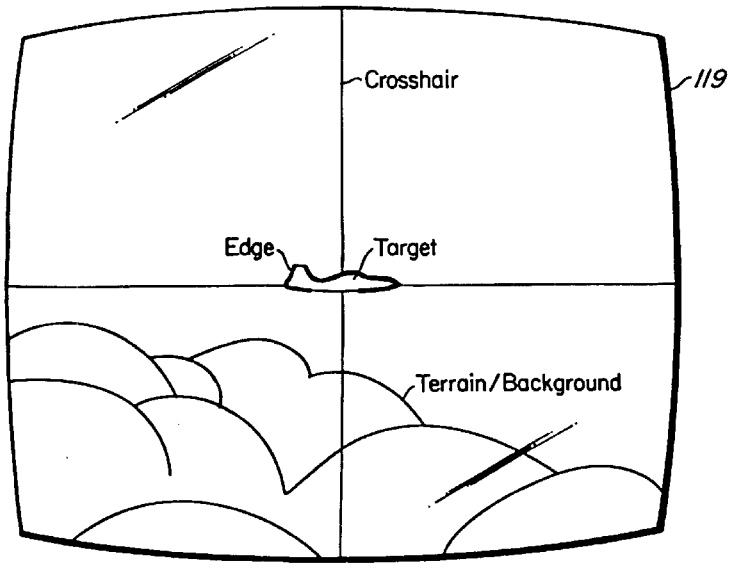
FIG. 2 is a video monitor display of a typical field of view observed Ctce CCD camera.

It is envisioned that the analog video processor invention be used in a CCD seeker which utilizes the imaging capabilities of a CCD in conjunction with the computing power of a $\mu$C. Important to the performance of such a tracking system is the circuitry which interfaces the imaging system to the computer system. The two circuit boards disclosed herein, VPP 101 and VP 103, perform this function to track and maintain a video display on video monitor 119 as indicated in FIG. 2. FIG. 2 depicts a cathode ray tube (CRT) display indicating a target having sharp edges separated from terrain and background and centered by crossbairs.

Figure 3:
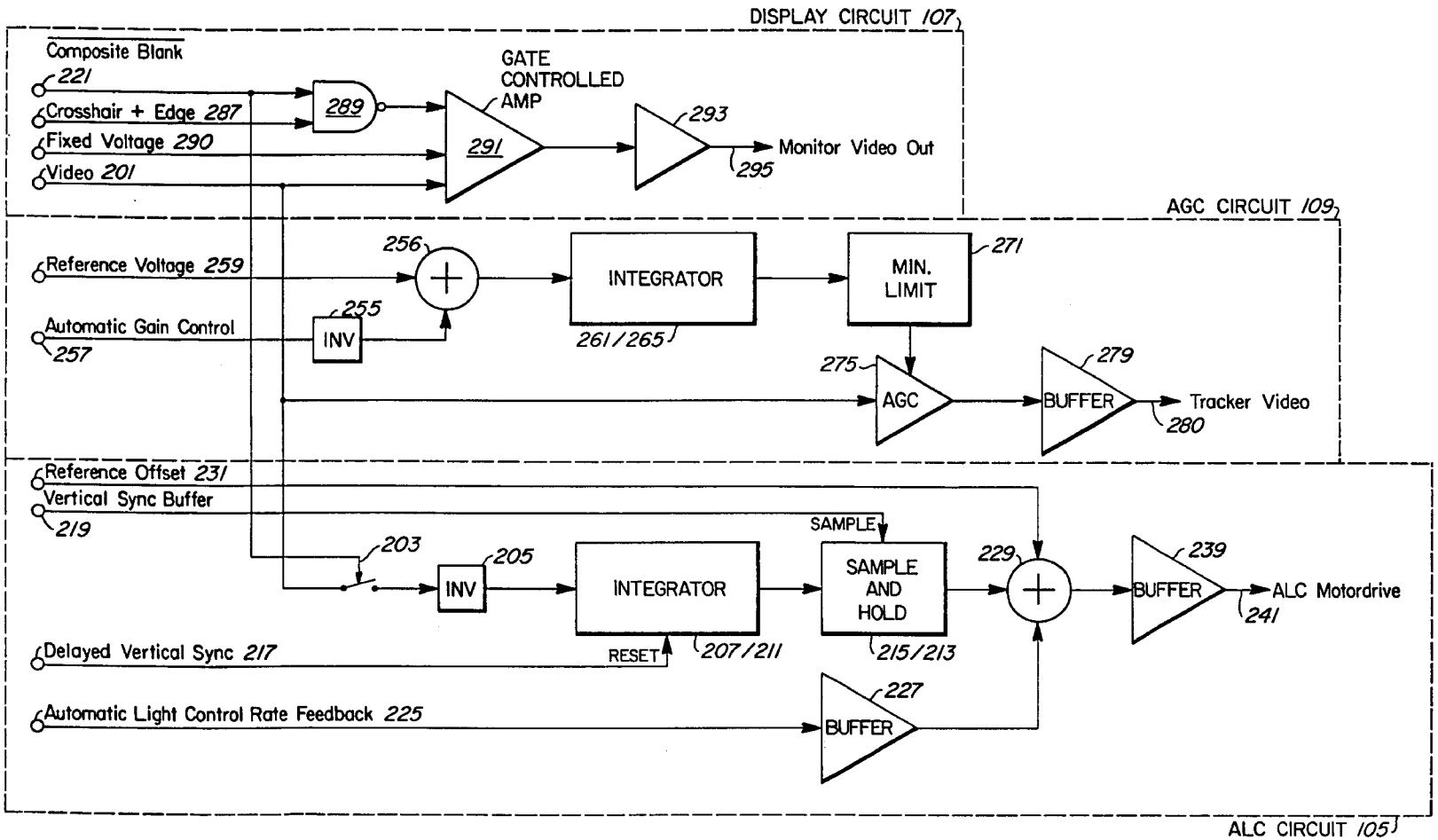
FIG. 3 is a block flow diagram of the VPP of the analog video processor.

Referring now to FIG. 3, a block/flow diagram of VPP board 101 is illustrated. The function of VPP board 101 is to present useful video from CCD camera 117 to VP board 103 by controlling video amplitude and exposure of the CCD array to light. Additionally, DP circuit 107 provides a video image to video monitor 119 of the scene the seeker is tracking as indicated in FIG. 2.

ALC circuit, dashed box 105, as illustrated in FIG. 3 is designed to maintain the exposure of light on the CCD array of CCD camera 117 at a level most advantageous for imaging and to prevent saturation of the array. An average value of video 201 from CCD camera 117 is obtained by proper switching 203 and inverting 205 before integrating each video field with an integrator 207/211 and associated components. Transfer function for integrator 207/211 is $V_o=V_i$ ($^{-K}/j\omega$) where $200<K<10^4$. This average is then sampled and held 215/213 at the end of each video field, and summed 229 with a reference offset voltage 231 and an ALC rate feedback (RFB) 225 function from CCD camera 117. This sum is amplified and buffered 239 and routed as a drive signal (ALC motor drive 241) to the iris on CCD camera 117 lens. The iris has two electrical windings, one being the drive coil and the other serving as a RFB. The output of the lighter coil is RFB function 225 that is summed with integrated video.

Referring now to the AGC circuit, dashed box 109 of FIG. 3, a brief description of the circuit follows. In order to maintain a video amplitude at a desired level for presentation to VP 103 a type I AGC circuit is incorporated into VPP 101 circuitry. Discounting a reference voltage 259, AGC circuit 109 has two inputs: video 201 from CCD camera 117 and an AGC function 257 from GP circuit 113. Video 201 is simply passed through an AGC amplifier 275 where the video gain is varied as a function of AGC function 257 and reference voltage 259. This signal, after passing through a buffer 279 becomes tracker video 280, the video input to VP 103.

AGC function 257 signal is generated in VP 103 as a feedback to AGC amplifier 275. Referring briefly to GP circuit 113 of FIG. 5, tracker video 280 is differentiated 307, then maximum and minimum peak detections 303/305 are performed on this differentiated video. The greatest magnitude 257/259 of these two signals is utilized as AGC function 257.

Referring back to AGC circuit 109 of FIG. 3, a difference circuit, summer 256, is used to output the difference between AGC function 257 and reference voltage 259. This difference, if non-zero, will cause an integrator 261/265 output to ramp up or down depending on the polarity of the difference. Transfer function for integrator 261/265 is $V_o=V_i$ ($^{-10}/J\omega$). Integrator 261/265 through a minimum limiter 271 provides the signal to control video gain at AGC amplifier 275. If integrator 261/265 output begins to increase, corresponding to excessive AGC signal the gain of AGC amplifier 275 is decreased, which in turn causes AGC signal 257 to decrease. In effect, AGC circuit 109 maintains video at an amplitude such that differentiated video peaks are held at constant values. AGC circuit 109 is set up to hold these values at a voltage such that differentiator circuit 307 in VP board 103 never saturates and such that differentiator 307 output noise is minimal. Reference voltage 259 for AGC circuit 109 is currently set at three volts for this purpose. Should integrator 261/265 output decrease to a value below this voltage, components, more clearly delineated in FIG. 4, conduct to maintain the desired minimum voltage and to prevent integrator 261/265 output from ever going negative. A negative output is not needed and could penalize the integrator circuit in response time.

Referring now to DP circuit, dashed box 107, of FIG. 3, a means of displaying the video being processed by the entire tracking system is provided. A gate controlled amplifier 291 is used as a two channel analog multiplexer to insert a crosshair or target edge function 287 from $\mu$C 121 into video monitor 119 for display. Again the typical tracking situation is shown in FIG. 2. A digital signal from $\mu$C 121 called crosshair OR'd with edges (crossbair+edge) 287 is basically what controls the channel select input on amplifier 291. Two input channels on gate controlled amplifier 291 are video 201 and a fixed voltage 290. Fixed voltage 290 establishes the brightness of edge information which appears on video monitor 119 when crosshair OR'd with edge is asserted. When crosshair OR'd with edge is not asserted, the video channel of gate controlled amplifier 291 is selected as its output and video 201 is passed to video monitor 119.

Figure 4:
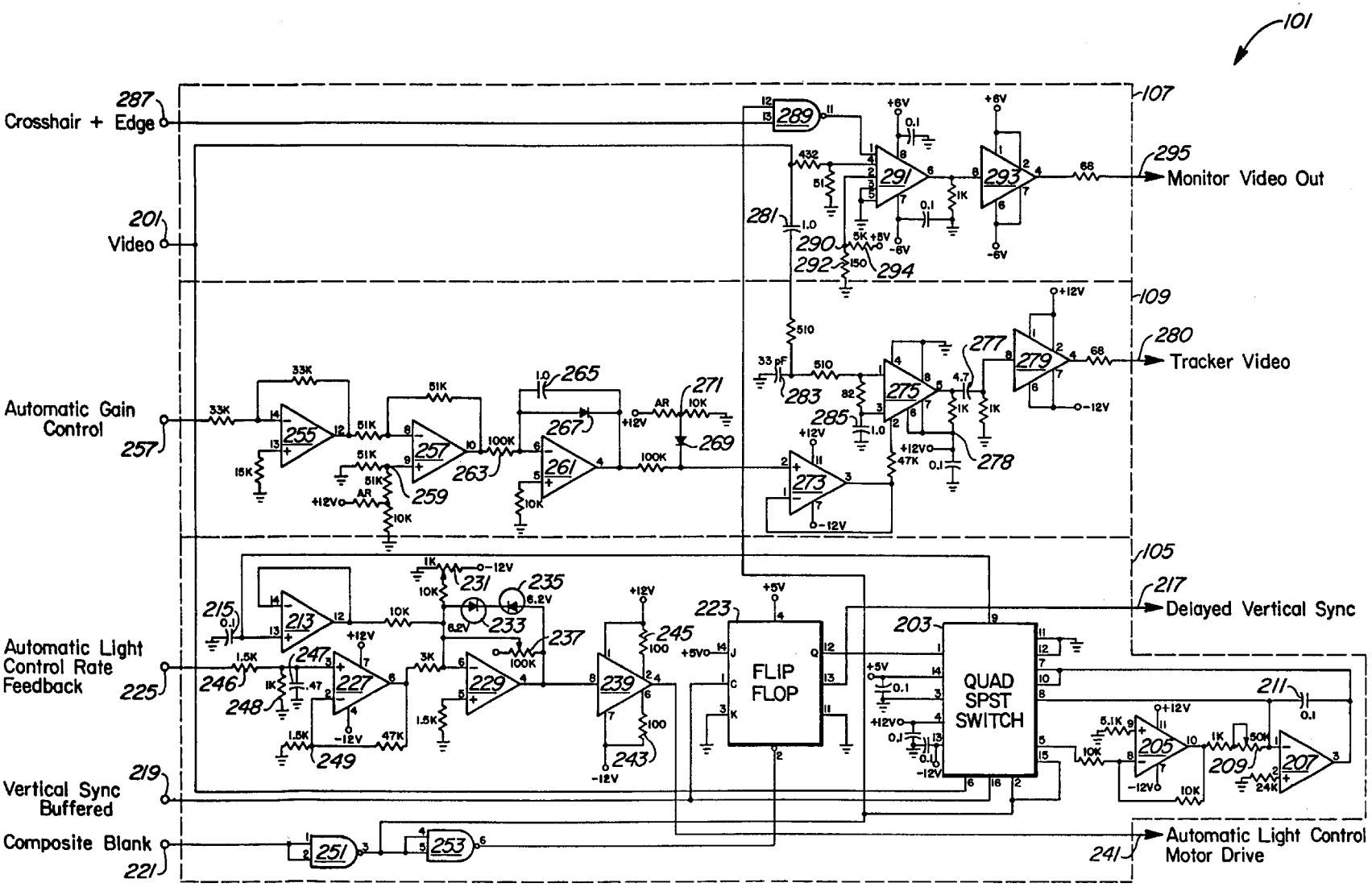
FIG. 4 is a detailed schematic of the VPP.

Referring now to FIG. 4, a more detailed schematic of VPP 101 is provided for which resistances are indicated in ohms, (Ω) kilo ohms (KΩ), or as required (AR), capacitances are indicated in microfarads ($\mu$F) and picofarads (PF), and power sources are indicated in volts (V).

Again, ALC circuit 105 controls the amount of light that impinges on the CCD array of CCD camera 117 to keep the light within a narrow band of dynamic range permitting CCD camera 117 to operate optimally to be able obtain optimal contrast and gradient signatures from a video output 201 of CCD camera 117.

Referring now specifically to the ALC circuit, dashed box 105 of FIG. 4, video 201 from CCD camera 117 is coupled at pin 6 to a ALC quad analog single pole single throw (SPST) switch 203 (AM0015) of ALC circuit 105. The purpose of ALC circuit 105 is to obtain an average video value per field; i.e. how bright is the field, the field being 1/60th of a second for one sweep through a CRT. ALC quad switch 203 gates video 201 to video monitor 119 to be off during horizontal and vertical blanking intervals. It should be noted that horizontal blanking is the period when the electron beam of the CRT retraces from right to left to start a new line of a field, and vertical blanking is the period when the beam retraces from lower right to upper left to start a new field, i.e. blanking prevents the beam from being seen on retrace.

ALC quad switch 203 passes video 201 to an ALC inverter 205, (4136 op amp ) which inverts video 201 to an opposite polarity to obtain the original polarity after integrating with an ALC inverting integrator 207 (4136 op amp ). An integrator potentiometer 209 permits control of gain on ALC integrator 207. The transfer function of ALC integrator 207 is $-1/j\omega RC$, where R is a potentiometer resistance 209, C is capacitance of a feedback capacitor 211, and $\omega$ is the radian frequency of the signal into integrator 207.

Output of ALC integrator 207 is coupled to ALC quad switch 203 to drain off the charge of feedback capacitor 211 through pins 7 and 8 of ALC quad switch 203 to reset ALC integrator 207 at the end of each field, after ALC integrator 207 output is passed through ALC quad switch 203 through pins 9 and 10 to the non-inverting input of an ALC buffer 213 (4136 op amp) and a holding capacitor 215 to charge holding capacitor 215 up to the same potential as the output of ALC integrator 207.

Feedback capacitor 211 is reset with a delayed vertical sync (DVS) function DVS signal 217 via ALC quad switch 203. DVS 217 is generated from the combination of a vertical sync-buffered (VSB) function 219 and a composite blank (CB) 221 function of CCD camera 117. VSB 219 is a function that occurs once every field sweep, i.e. one trace of the CRT electron beam top to bottom, every 1/60th of a second, to allow video monitor 119 to be in sync with video 201 of CCD camera 117. Horizontal sync provides the same function on a horizontal, line by line, basis. Vertical and horizontal sync allow $\mu$C 121 to know when CCD camera 117 is between fields or lines of view.

Again, DVS 217 is generated from the combination of VSB 219 and a CB 221 functions of CCD camera 109 via an ALC JK flip flop 223 (SN54LS73) coupled to ALC quad switch 203. CB 221 is a combination of horizontal and vertical blanking functions of CCD camera 117. It should be noted that DVS 217 is derived from the combination of VSB 219 and the vertical portion of CB 221. DVS 217 occurs immediately after VSB 219. DVS 217 prevents ALC integrator 207 from being reset before its output voltage is transferred to holding capacitor 215.

Output of ALC buffer 213 yields a value representative of the average video brightness for the past field. A tachometer/ALC-RFB function 225 from CCD camera 117 passes through an RFB buffer 227 ($\mu$A741 op amp) which lowpass-filters (LPF) and amplifies ALC-RFB input 225. Capacitor 247, in conjunction with resistors 246 and 248, serves as a LPF, thereby eliminating undesirable high frequency components from RFB function 225. A voltage divider 249 establishes the gain of RFB buffer 227.

Output of RFB buffer 227 is summed by an ALC summer 229 (4136 op amp) with the brightness value Qf ALC buffer 213 and a DC value from a summer potentiometer 231 which inserts a DC bias into the output value of ALC summer 229.

Back-to-back zener diodes 233 and 235 prevent output of ALC summer 229 from ever exceeding a certain amplitude envelope (e.g. ±7 volts). If the voltage (6.2 volts reverse, plus 0.8 volts forward) of zener diodes 233 and 235 is exceeded by ALC summer 229 output, diodes 233 and 235 breakdown and directly limit the feedback of summer 229, which control the output of ALC summer 229; i.e. zener diodes 233 and 235, conduct increasing feedback, if ALC summer 229 output exceeds a certain positive voltage, and zener diode 235 and 233 conduct if ALC summer 229 output goes below a certain negative voltage. A summer feedback potentiometer 237 controls the overall gain and allows amplification of ALC summer 229 to be set as desired. In short, the ALC drive gain is controlled by summer feedback potentiometer 237, which is parallel with the combination of zener diodes 233 and 235. These diodes limit the output of ALC summing amplifier 229 to an amplitude of approximately ± 7 volts in order to protect the iris drive winding of CCD camera 117.

By varying the wiper position of summer potentiometer 231, it is possible to change the iris opening to achieve brighter or darker video. After setting the desired light level with summer potentiometer 231 for a particular video scene, ALC circuit 105 will attempt to maintain the same average light level at the CCD array for any other scene, whether brighter or darker.

Again, summer feedback potentiometer 237 controls the overall gain and allows amplification of ALC summer 229 to be set as desired. Output of ALC summer 229 is then buffered by an ALC current amplifier 239 (LM0002) to yield an ALC motor drive function output 241 to control the iris which controls the light to the CCD array in CCD camera 117. Current limiting resistors 243 and 245 on ALC current amplifier 239 prevent current to ALC motor drive 241 from attaining values that would harm ALC motor drive 241.

In summary, video 201 is first passed through ALC quad switch 203 where all sync pulses are gated out with inverted composite blanking (CB). This prevents signals from being integrated by ALC integrator 207 which are not actually modulated by scene brightness. The resulting switched video is inverted and buffered by ALC inverter 205 and then integrated and again inverted by ALC integrator 207. The gain of ALC integrator 207 is controlled by integrator potentiometer 209. Precaution should be taken when varying this gain such that ALC integrator 207 never saturates for high intensity video fields, thereby adding a non-linearity to the system. At the end of the video field currently being integrated, the final value of the integral is transferred to holding capacitor 215 via ALC quad switch 203. The digital signal controlling this transfer through ALC quad switch 203 is buffered vertical sync 219 (VSB). After this transfer has taken place, ALC integrator 207 is initialized for the next field of video by shorting across integration capacitor 211 with the ALC quad switch 203. Integration capacitor 211 is shorted by ALC quad switch 203 when delayed vertical sync (DVS) 217 is asserted. DVS is derived at ALC flip flop 223.from vertical sync-buffered (VSB) 219 and composite blank (CB) 221. The stored integral value at holding capacitor 215 from the previous field of video is then buffered by ALC buffer 213 and presented to ALC summing amplifier 229. Since integrated video represents a scaled average of the scene brightness, ALC circuit 105 controls the iris opening as a function of this average.

Referring now to the AGC circuit, dashed box 109 of FIG. 4, an AGC inverter 255 (4136 op amp) inverts polarity of a AGC function 257 from GP circuit 113 of VP 103 with respect to 0 volts; i.e. AGC function 257 comes into VPP 101 as a negative voltage, but a positive voltage is required. Output of AGC inverter 255 is summed in an AGC summer 257 (4136 op amp) with a DC offset voltage via a voltage divider 259 on pin 9; providing an offset/DC pedestal for AGC summer 257.

Output of AGC summer 257 is integrated with respect to time by an AGC integrator 261 (4136 op amp). Gain of integration is a function of resistor 263 and integrator feedback capacitor 265 at pin 6; i.e. impedance of capacitor 265 is a function of frequency and therefore a function.of time. Integrater feedback diode 267 (5002-2000) prevents output of AGC integrator 261 from ever going below 0 volts. A following diode 269 (1N916) on a voltage divider 271 prevents output of AGC integrator 261 from ever going below a certain voltage.

Output of AGC integrator 261 is then buffered by an AGC buffer 273 (4136 op amp). Output of AGC buffer 273 is coupled to pin 2 of an AGC wideband amplifier 275 (MC1590) and controls the gain of AGC amplifier 275. Keeping AGC amplifier 275 pin 2 above a certain minimum voltage prevents AGC amplifier 275 from exceeding a certain gain (inverse function). This voltage minimum was provided with diode 269. Since a large capacitance is needed to pass very low frequencies down to nearly (but not including) DC, an electrolytic capacitor 277 is utilized to prevent any DC from being passed by AGC amplifier 275 to an AGC current amplifier 279 (LM0002) to yield a tracker video function or output signal 280. Tracker video function 280 is an AGC controlled gain that goes to VP 103 for further processing to provide gradient and contrast signatures. Since a reverse polarity voltage to electrolytic capacitor 277 acts like, a short circuit, pin 5 of AGC amplifier 275 must be positive via power source 278 with respect to ground.

Input to AGC amplifier 275 is a bandpass filter (BPF) to video 201; i.e. it will not pass DC or AC above approximately 18 MHz. Low frequency and DC are cut off by a series capacitor 281, an open circuit to DC, and high frequency AC is shunted by parallel capacitors 283 and 285; i.e. capacitors 283 and 285 short to ground at high frequencies.

As a means of displaying the video being processed by the entire tracking system, a DP circuit, dashed box 107 of FIG. 4, is utilized. A crosshair OR'd with edge function (XHR+EDG) 287 from $\mu$C 121 is input to a third WAND gate (54LS00). Edges represent what $\mu$C 121 thinks are targets as presented to it by VP 103, and crosshair is a $\mu$C 121 function which when displayed on video monitor 119 shows what $\mu$C 121 is tracking. Crosshair+Edge function 287 is combined with composite blanking (CB) 221 via first NAND gate 251 in such manner that $\mu$C 221 turns XHR+EDG 287 off during the horizontal or vertical blanking interval; i.e. either horizontal or vertical blanking will disable XHR+EDG 287.

Output of third NAND gate 289 is input to a gate controlled two channel wideband DP amplifier 291 (MC1445) which switches, back and forth, video 201 at pin 4 with a fixed reference voltage at pin 6. Fixed reference voltage at pin 6 appears as white on video display/monitor 119. Therefore, a white XHR+EDG 287 information from $\mu$C 121 or the actual video 201 will appear on video monitor 119 as controlled by pin 1 of DP amplifier 291. Output of DP amplifier 291 is buffered via a DP current amplifier 293 so that video monitor 119 can be driven by a monitor video output function 295.

Monitor video output function 295 is a video signal that contains all composite syncs and composite blankings necessary to be able to couple with video monitor 119; thereby displaying crosshairs and edges and a video scene observed by CCD camera 117 as indicated in FIG. 2.

In short, DP amplifier 291 is used as a two channel analog multiplexer to insert CRT crosshairs and target edges from $\mu$C 121 into video monitor 201. The output of DP amplifier 291 is buffered by DP current amplifier 293 which transmits video to video monitor 119 for display. Again, the typical tracking situation is shown in FIG. 2. The digital signal from $\mu$C 121 called XHR+EDG 287 is basically what controls. the channel select input on DP amplifier 291. The two input channels on DP amplifier 291 are composite video 201 and a fixed voltage determined by a voltage divider 290 and the combination of resistors 292 and 294. This voltage establishes the brightness of crosshair or edge information which appears on video monitor 119 when XHR+EDG 287 is asserted. When XHR+EDG 287 is not asserted, the video channel of DP amplifier 291 is selected as its output and video is passed to video monitor 119.

The remaining resistors, capacitors, power sources, and first and second NAND gates 251 and 253 (54L500) are included in VPP circuit 101 as indicated in FIG. 4 as is conventional in the art for the components utilized.

Figure 5:
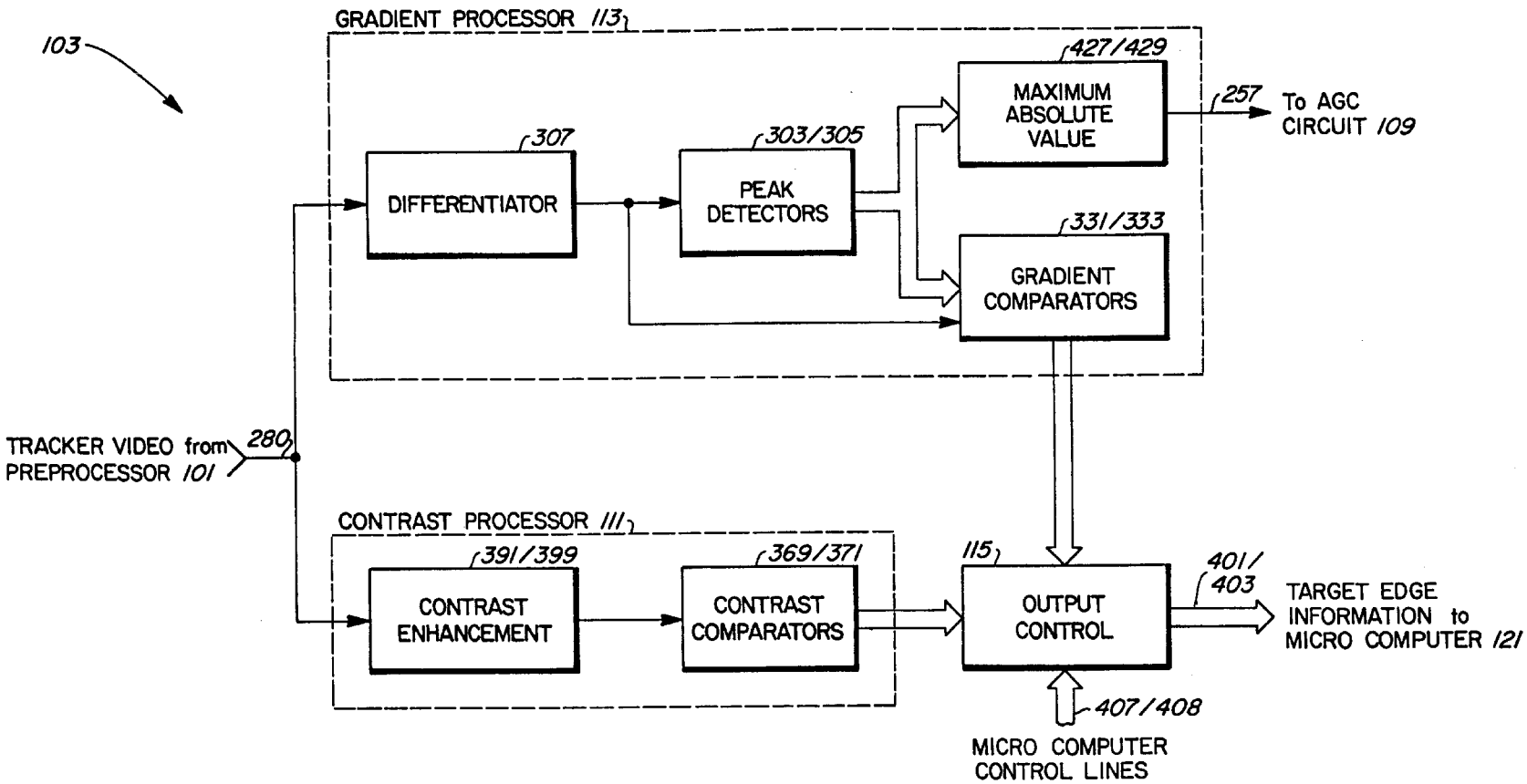
FIG. 5 is a block flow diagram of the VP of the analog video processor.
Figure 6A:
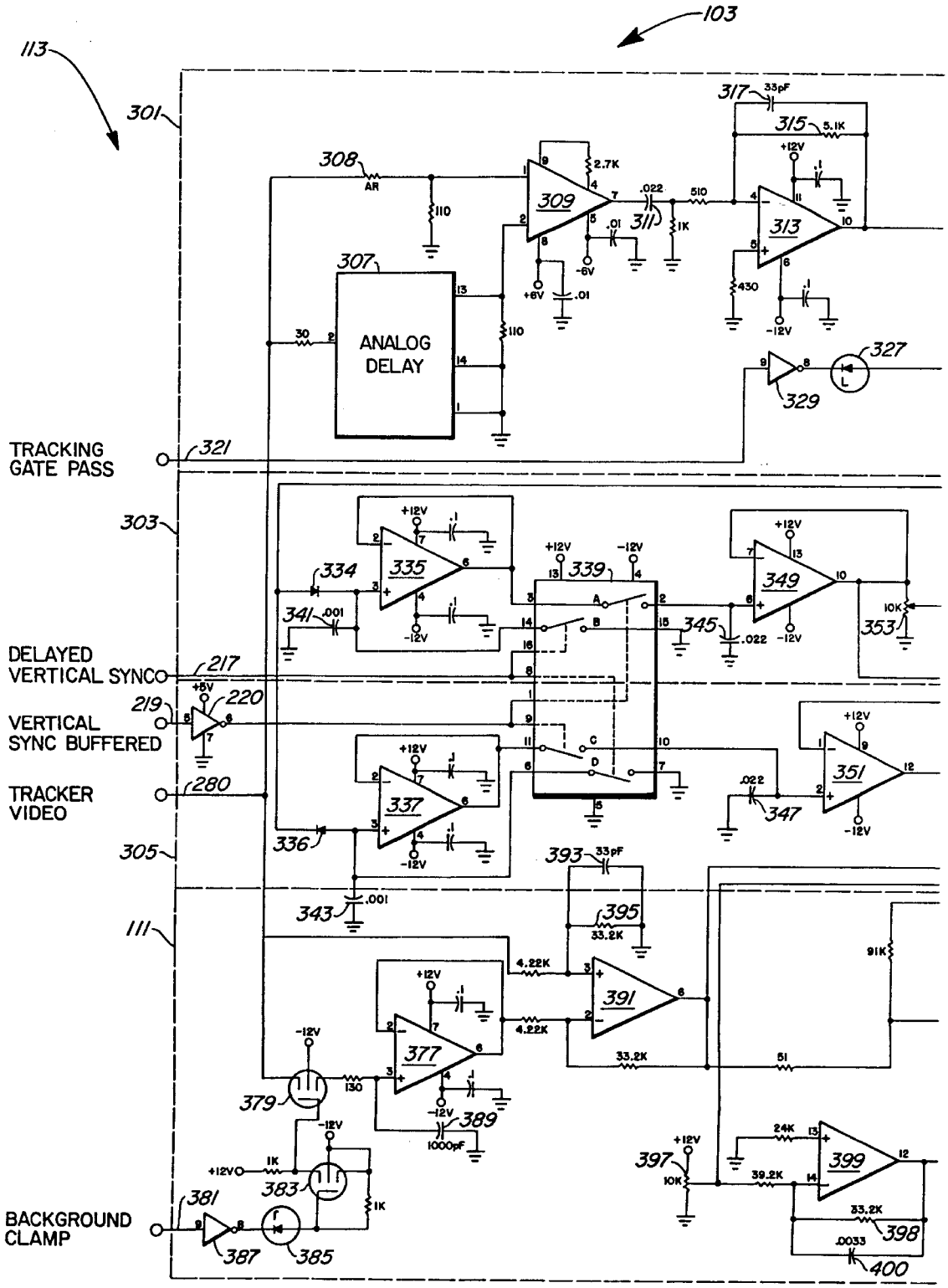
FIG. 6 is detailed schematic of the VP.
Figure 6B:
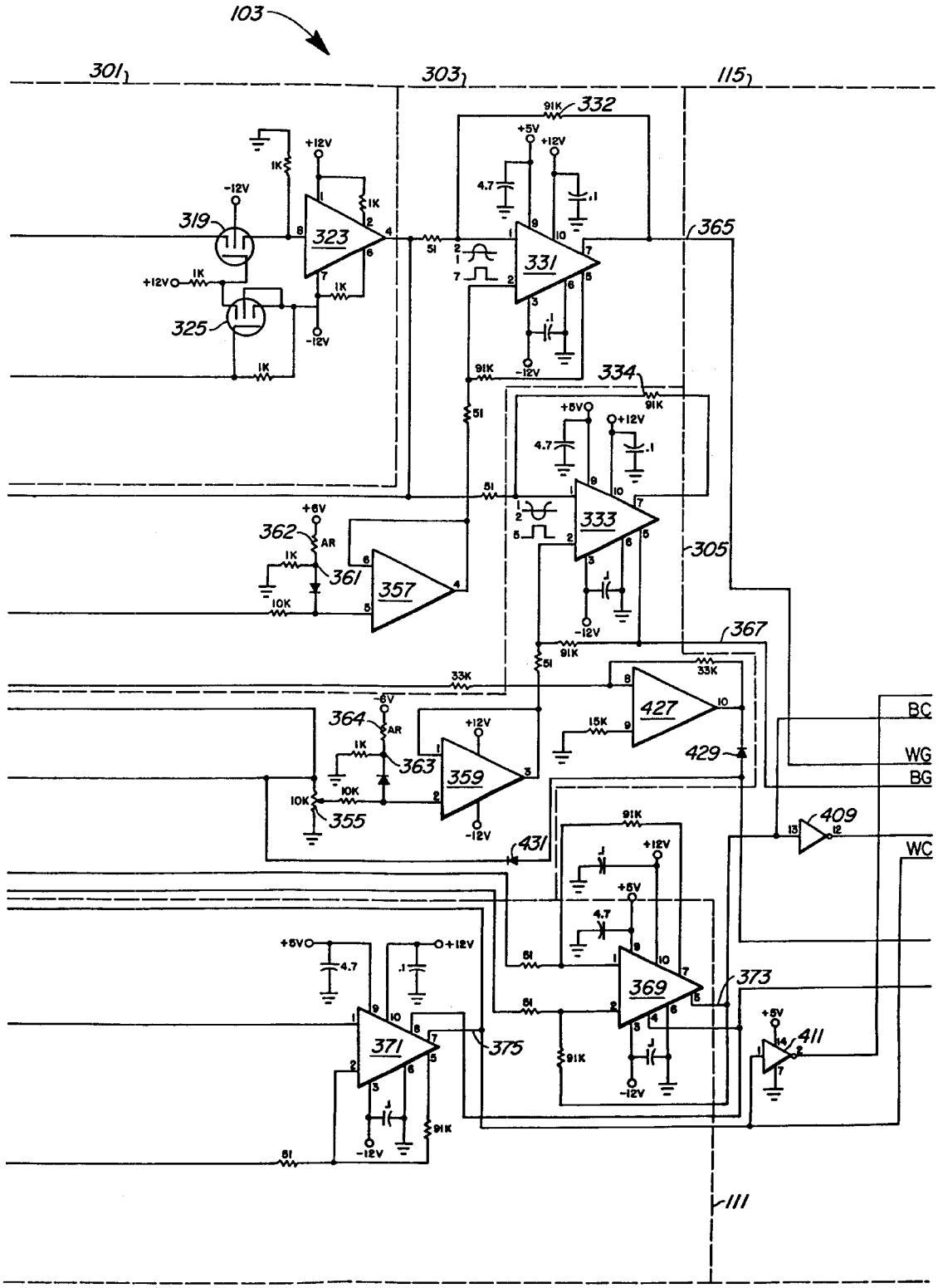
Figure 6C:
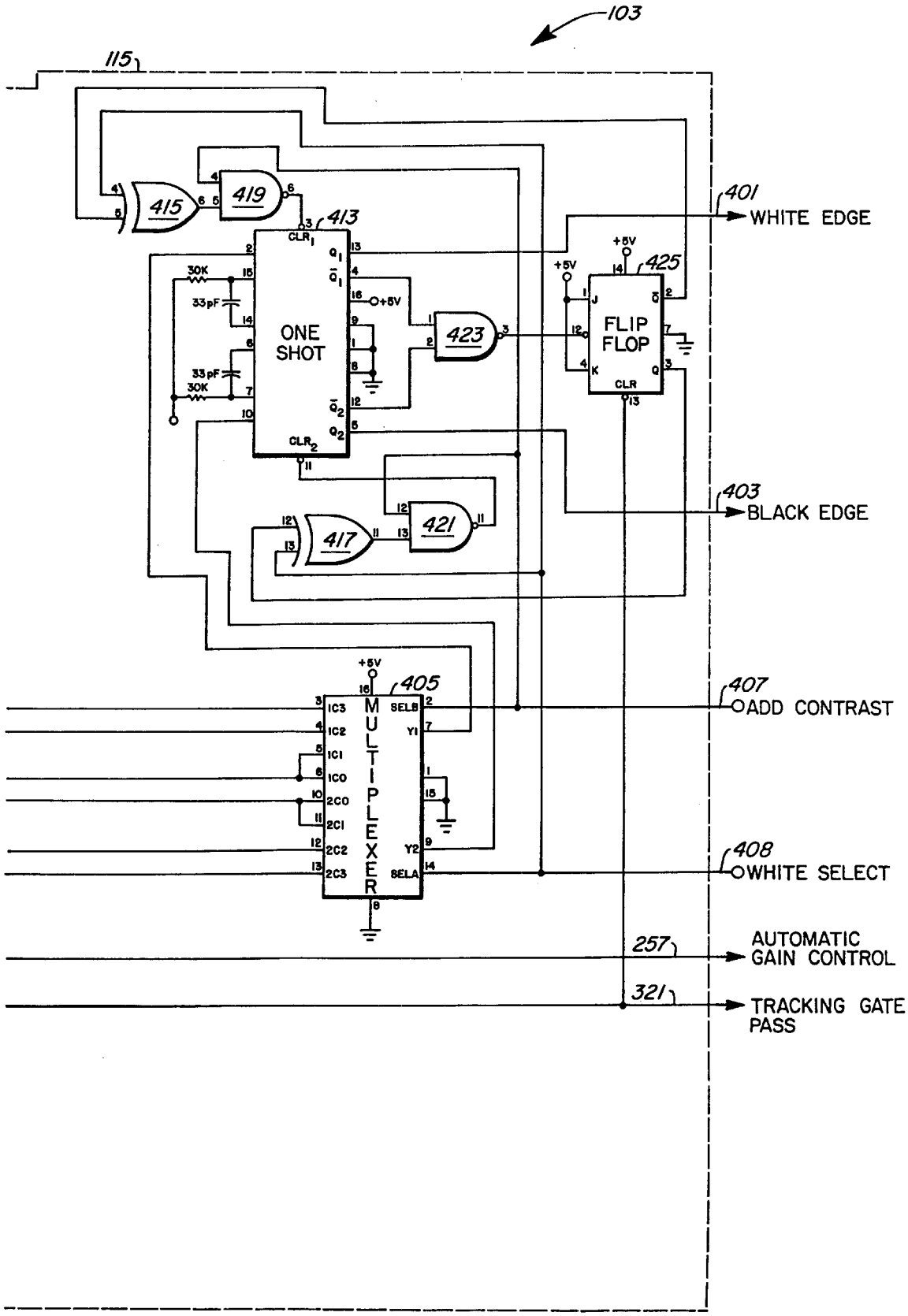

Referring now to FIG. 5, a block flow diagram of VP 103 is illustrated. Extraction of potential targets from video 201 (tracker video 280) and subsequent presentation of these targets to $\mu$C 121 are performed by VP 103. FIG. 5 depicts the main functional blocks within VP 103 as a whole. A detailed schematic is illustrated in FIG. 6. VP 103 is comprised of three basic circuits: CP circuit 111, GP or edge circuit 113, and OC circuit 115. Both contrast and gradient processors 111 and 113 are. capable of providing signatures for potential targets which are either light or dark relative to the background.

Gradient processor (GP) circuit, dashed box 113, detects potential targets with the best edges, or those edges containing the highest spatial frequency components within the field of view. Basically, GP circuit 113 is a high pass-spatial filter with a cut off frequency determined by the spatial frequency bandwidth of the image from CCD camera 117. Assuming that man-made-objects have-sharper-edges than natural objects, GP circuit 113 has a capability of extracting desired targets from terrain cluttered backgrounds. In effecting this process, tracker video 280 is first received by a differentiator 307. The output of differentiator 307 is actually an approximation to differentiation rather than true differentiation. The differential result closely approximates differentiation over a finite bandwidth and is relatively noise free. Differentiated video is then amplified and passed through-a switch, which allows only differentiated video occurring within a tracking gate to be processed. Gated differentiated video is routed to gradient comparators 331 and 333, as well as to peak maximum and minimum detectors, 303 and 305. After buffering peak thresholds derived from peak detectors 303 and 305 are compared with original differentiated video by gradient comparators 331 and 333. Any differentiated video that exceeds a positive threshold will cause the output of comparator 331 to transition to a logical-one. Similarly, any differentiated video having a negative amplitude less than a negative threshold will cause comparator 333 to output a logical one. At this point, only the objects within the tracking gate having the sharpest edges have been extracted from the video and converted to digital signals. These gradient signatures are presented to the OC circuitry 115 as white gradient (WG) and black gradient (BG). Maximum absolute values 427/429 are derived from peak detectors 303/305 to yield AGC function 257 for VPP board 101.

CP circuit dashed box 111, rather than detecting targets as a function of edge quality, detects them as a function of amplitude. As with GP circuit 113, CP circuit 111 input is also tracker video 280. The input circuitry consist of a contrast enhancer 391/399 which samples the background on each side of the target, subtracts this background from tracker video 280 via contrast comparators 369/371, and then amplifies the result.

OC circuit 115 receives inputs from GP circuit 113, CP circuit 111, and $\mu$C 121 control signals 407/408 to convert asynchronous gradient.and contrast signatures to signal formats that are detectable by synchronous means at the input of $\mu$C 121.

Referring now to FIG. 6, a more detailed schematic of VP 103 is provided for which resistances are indicated in ohms (Ω), kilo ohms (KΩ), or as required (AR), capacitances are indicated in microfarads ($\mu$F) and picofarads (PF), and power sources are indicated in volts (V).

GP circuit, dashed box 113, comprises a gradient circuit dashed box 301, a maximum detector circuit dashed box 303 and a minimum detector circuit dashed box 305. In GP circuit 113, tracker video function 280 from AGC circuit 109 is coupled to an analog delay 307 (PE9825) and a first GP amplifier 309 (SE592). Output of analog delay 307 is also coupled to first GP amplifier 309. Output of first GP amplifier 309 is real time video (tracker video) with delayed tracker video subtracted from it, yielding a difference video or approximated differentiated video.

A series capacitor 311 blocks DC output of first GP amplifier 309, i.e. high pass filter (HPF), centering the signal around 0 volts. This HPF signal is coupled through a lowpass filter (LPF), second GP amplifier 313 (HA5190 op amp); i.e. resistors 315 in parallel with a feedback capacitor 317 enables second GP amplifier 313 to function as a LPF. Second GP amplifier 313 is used primarily for noise reduction but provides a gain also and provides a differentiated video signal as an output. Only part of that signal is desirable at appropriate times. Therefore, a first field effect transistor (FET) switch or gradient processor analog video switch (GPAVS) 319 (SD215) turns the signal off when not desired. The part of the signal desired corresponds with a tracking gate, pass (TGP) function or TG signal 321 from CP circuit 111. When TGP 321 is asserted first FET switch 319 is closed and video passes to a GP current amplifier 323. Output of GP current amplifier 323 is a gated version of output of second GP amplifier 313. First FET 319 won't conduct current from source to drain until the gate is brought to a high voltage. Gate of first FET 319 goes high when gate of a second FET 325 (SD211) goes low (turns off). Gate of second FET 325 remains low as long as the breakdown voltage of a zener diode 327 (1N963B) is not reached, which in turn is controlled by the inverted, via GP inverter 329 (54LS04), TGP function 321.

Gated/differentiated video.ois therefore the output of GP. current amplifier 323 which passes to a first and second gradient comparators 331 and 333 respectively (SE527) and to positive and negative/maximum and minimum peak detector circuits 303 and 305, respectively. Video in first and second gradient comparators 331 and 333 is compared to thresholds derived from peak detectors 303 and 305.

Peak detectors 303 and 305 operate for the duration of the entire field of video (1/60th second). Maximum peak detector 303 looks for a positive peak and minimum peak detector 305 looks for a negative peak in the gated/differentiated video output of GP current amplifier 323. In peak detectors 303 and 305 gated/differentiated video passes through first and second wideband peak detector amplifiers 335 and 337 (op amps OP15) and through a GP analog quad SPST switch 339 (HI201). VSB 219, inverted by a GP inverter 220 (U19A) is again used to reset peak detectors 303 and 305 via GP quad switch 339, by bleeding off a first and second capacitors 341 and 343 to ground via pins 14/15 and 6/7 of GP quad switch 339, thereby resetting positive and negative peak detectors 303 and 305 for the next field. Holding capacitors 345 and 347 hold the sampled voltages, which are coupled to the high impedance inputs of a first and second GP buffers 349 and 351 (747 op amps). These high impedance inputs prevent the voltages of hold capacitors 345 and 347 from "bleeding" off.

GP potentiometers 353 and 355 at the output of sample and hold GP buffers 349 and 351 allow pick off of a percent of that voltage, e.g. 75%. That percentage, on passing through a third and fourth. GP buffers 357 and 359 (4136 op amps) is compared with original video (tracker video 280) in first and second gradient comparators 331 and 333, respectively. Resistor/diode (1N916), voltage divider networks 361 and 363 prevent thresholds of third and fourth GP buffers 357 and 359 from ever going too low to get down into peak noise levels.

In first and second gradient comparators 331 and 333, pin 1 is the actual video input, pin 2 is the threshold (max. and min.) and pins 7 and 5 of 331 and 333, respectively, are the output pulses; i.e. as diagrammed in the schematic a logical one occurs whenever the input on pin I exceeds/falls below the max./min. threshold on pin 2. Outputs of gradient comparators 331 and 333 (pins 7 and 5 respectively) are white gradient (WG) 365 and black gradient (BG) 367, respectively, which are the digitized gradient signatures.

The remainder of GP circuit 113 is a GP inverter 427 (4136 op amp) which couples the output of maximum detector circuit 303 buffer 349 through a reverse bias diode 429 (1N916) to yield AGC 257 output. Output of minimum detector circuit 305 buffer 351 is coupled directly through a reverse bias diode 431 (1N916) to AGC 257 output.

Referring now to the CP circuit, dashed box 111 in FIG. 6, instead of differentiating the video as in GP circuit 113, the video (tracker video 280) is directly compared through a first and second contrast comparators 369 and 371 with a fixed threshold with respect to background on either side of the target. Outputs of contrast comparator 369 and 371 are black contrast (BC) 373 and white contrast (WC) 375, respectively.

White contrast (WC) 375 and black contrast (BC) 373 threshold are developed by sampling video on both sides of the target with a sample and hold CP buffer 377 (OP15 op amp) and a third FET switch or contrast processor analog video switch (CPAVS) 379 (SD215). A background clamp (BKCL) function or signal 381 from $\mu$C 121 tells third FET switch 379 when to open and close, i.e. tells CP buffer 377 when to sample and hold video values. This allows sampling on each side of the target which gives an idea of background in the vicinity of the target. A fourth FET 383 (SD211), zener diode 385 (1N963B) and CP inverter 387 (U18B) function in like manner as described in GP circuit 301; i.e. BKCL 381 is inverted by CP inverter 387 passing through zener diode 385 to shift the signal to a level that can be used on the gate of second FET 383, to turn FET 383 on/off which in turn turns first FET 379 on/off; i.e. when the gate of FET 383 goes low FET 383 turned off which causes the gate of FET 379 to go high turning Fet 379 on. When BKCL 381 goes high, third FET 379 is turned on, which causes background in a period of video to charge up capacitor 389. CP buffer 377 yields a buffered version of that voltage as input to a CP difference amplifier 391 (HA2520 op amp), where the background value is subtracted from the original tracker video 280 which centers the modified video around 0 volts on a line by line basis. Feedback capacitor 393 and parallel resistor 395 yield an LPF effect to delete noise to the input of CP amplifier 391. All video is thereby shifted such that background is now at 0 volts.

CP circuit 111 is used only after entering the track mode where the target has been identified/located. BKCL 381 is a signal representative of where the background is located on each side of the target; i.e. a small pulse to the left and right of the target. A sample-and-hold of video on either side of the target gives an idea of what the background level is around the target. That value operated upon by CP buffer 377 is held by holding capacitor 389.

Again, all video is thereby shifted such that background is now at 0 volts. Two contrast thresholds are set above and below that voltage (background) by a CP threshold potentiometer 397; the thresholds are set to slightly exceed noise and clutter (clouds, mountains, terrain). Threshold voltages are needed above and below a background; i.e. a threshold for BC first contrast comparator 369, and threshold for WC, second contrast comparator 371. To obtain proper polarity for second contrast CP comparator 371 a comparator inverter 399 (4136 op amp) is inserted to get an equal amplitude negative version of potentiometer 397 output and to serve as a LPF via parallel feedback resistor 398 and capacitor 400. Each threshold, above background and below background is compared against output of CP difference amplifier 391 (contrast enhanced video) by first and second contrast comparators 369 and 371 to provide contrast signatures of the target. If the target exceeds a certain brightness, i.e. goes above white threshold, white/second contrast comparator 371 issues a pulse output. When a target goes below a certain brightness determined by black/threshold, it is considered a black target and black first contrast comparator 369 issues a pulse output.

Referring now to the OC circuit, dashed box 115 of FIG. 6, four signals, white gradient (WG) 365, and black gradient (BG) 367 from GP circuit 113 and white contrast (WC) 375 and black contrast (BC) 373 from CP circuit 111 are converted into white edge (WE) 401 and black edge (BE) 403 via OC circuit 115. To do so, BG 367, WG 365, BC 373 and WC 371 signatures are input to a dual four to one multiplexer 405 (54LS153). First and second OC inverters 409 and 411 serve to provide an inverted as well as direct BC and WC signatures into multiplexer 405. Gradient signatures 365 and 367 represent edges and contrast signature's 375 and 373 represent brightness; i.e. any time a target exceeds a certain brightness there exists a pulse associated with the length. of time the target exceeded that brightness during the left/right scan of video monitor 119.

At this point of the circuit there exist two types of signature that need to be converted into white edge 401 and black edge 403. When an add contrast (A/C) function or signal 407 from $\mu$C 121 is high (contrast mode) multiplexer 405 selects only WC 375 and BC 373 as inputs, exiting at multiplexer pins 7 and 9. When A/C 407 is low (gradient mode) WG 365 and BG 367 are passed through multiplexer 405. A white select (W/S) function or signal 408 from $\mu$C 121 affects the operation of multiplexer 405 only if A/C function 407 is asserted high. W/S 408 causes either inverted or direct WC/BC to be passed to multiplexer 405 pins 7 and 9 as necessary for correct interpretation of WC/BC as white or black targets by $\mu$C 121.

Because WE and BE signals are asynchronous and are sampled by a synchronous interface circuit in $\mu$C 121, WE and BE both have been assigned a minimum pulse width of 300 nanoseconds. This is accomplished by using a dual one shot 413 (54123). Undesired triggering of one shot 413 is prevented with a combination of a first and second exclusive OR gates 415, 417, a first, second and third OC NAND gates 419, 421 and 423 and an OC flip flop 425. Multiplexer 405 combines the four outputs of GP 113 and CP 111 circuits into two signals that trigger one shot 413. The combination of these four lines into two output lines depends on two digital signals from $\mu$C 121: add contrast (A/C) 407 and white select (W/S) 408. If A/C 407 is asserted, $\mu$C 121 is requesting contrast signatures; therefore, the two edge outputs are derived from WC and BC. Similarly, if A/C 407 is not asserted, $\mu$C 121 is requesting.gradient information; in this case, WG and BG are passed to the edge outputs. W/S 408, if asserted, indicates $\mu$C 121 is tracking a white target and expects to encounter a white edge-before detecting a black edge. The inverse is true if W/S 408 is not asserted. Multiplexer 405 performs this function also as requested by W/S 408. The final outputs from VP 103 are taken from dual one shot 413 as WE 401 and BE 403.

Figure 7:
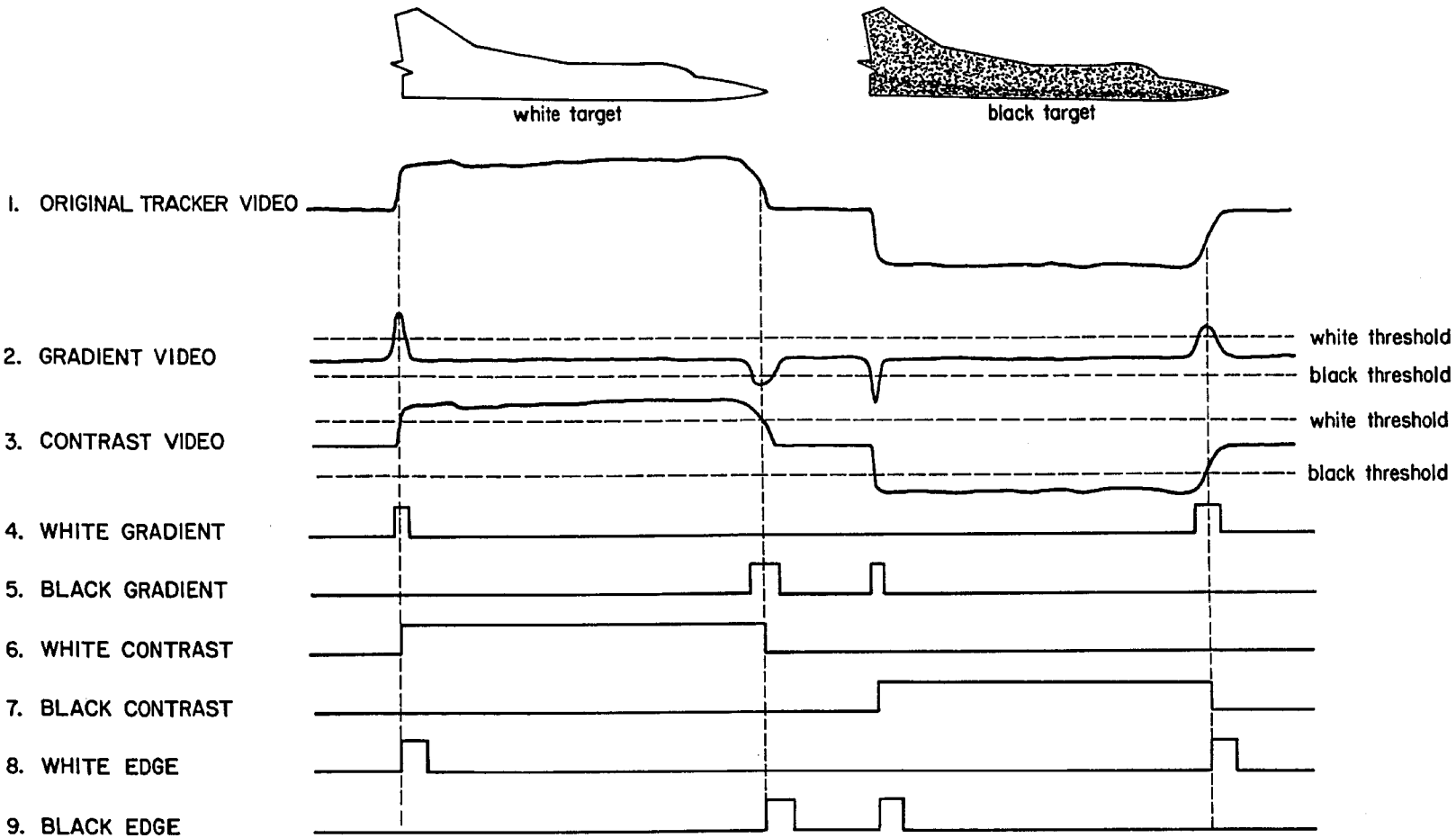
FIG. 7 is a rough timing diagram for input/output of the OC circuit of the VP.

Referring briefly to FIG. 7, a rough timing diagram is provided to give the reader a better perspective of inputs and outputs to OC circuit 115.

Original video/tracker video 280 (line one) is depicted having a white target and a black target. Gradient video (line two) is the differentiated version of original video (line one). Contrast video, (line three), resembles original video but is offset relative to background on each side of the target; its waveform, however, is identical to original video (line one).

In gradient mode, a threshold is set above (white) gradient video and below (black) gradient video in line two. Gradient video of line two is centered at a steady-state value of zero volts.

In contrast mode, thresholds are set in contrast video (line three) above and below background; i.e. video value on each side of each target.

White gradient (line four) yields a pulse whenever a positive peak exceeds the white threshold in gradient video (line two). Black gradient (line five) yields a pulse whenever a negative peak exceeds the black threshold in gradient video (line two).

White contrast (line six) yields a pulse whenever a positive contrast video exceeds a positive threshold in contrast video (line three). Black contrast (line seven) yields a pulse when a negative contrast video exceeds a negative threshold in contrast video (line three).

White and black edge information is obtained from any of the above four signals (white gradient/black gradient, white contrast/black contrast). Edge information is inherent in gradient video (line two). A white edge pulse (line eight) occurs on the leading edge of a white target in original video (line one) and another occurs on trailing edge of the black target in original video (line one). A black edge pulse (line eight) occurs on the trailing edge of a white target and on-the leading edge of a black target.

In short, a white edge (WE) in the gradient mode is a positive going gradient peak and black edge (BE) in the gradient mode is a negative going gradient peek. In contrast mode, white edge is the leading edge of the white contrast pulse or the trailing edge of a black contrast pulse, and black edge is the trailing edge of the white contrast pulse or the leading edge of a black contrast pulse.

Referring again to FIG. 6, one shot 412 is used as a pulse shrinker, or expander as necessary, and edge detector, i.e. to convert WC, BC, WG, BG to WE and BE, of pulse width of 300 nsec. A positive transition in WC 375 (line 6, FIG. 7) yields a white edge pulse 401 (line 8, FIG. 7) and a negative transition in white contrast 375 (line 6, FIG. 7), i.e. the trailing edge for a white target, yields a black edge pulse 403 (line 9, FIG. 7).

The feedback circuit to one shot 413, consisting of first and second exclusive OR gates 415 and 417 (54LS86) first, second and third OC NAND gates 419, 421 and 423 (54LS000) and a OC JK flip flop 425 (54LS107), prevent one shot 413 from outputting another edge pulse from another leading edge until a corresponding trailing edge occurs; i.e. prevents retriggering on another leading edge until the-corresponding trailing edge. A target is defined as a leading edge followed by a trailing edge.

The feedback circuitry prevents one shot 413 from passing consecutive contrast target edges of a single color; e.g. after generating a white edge (line 8, FIG. 7) one shot 413 cannot generate another white edge until generating an intervening black edge (line 9, FIG. 7). This applies to only a single line of video within tracking gate pass 321. As a result, inadvertent triggering by noise of one shot 413 between target edges is prevented.

The foregoing is only true for the situation in which A/C 407 is equal to a logical one (contrast mode) since the feedback path is disabled by A/C 407 equal 0.

Feedback is generated by the following process. Any edge, either black edge or white edge, causes OC flip flop 425 to toggle. Complemented outputs from OC flip flop 425 are exclusive OR'd (415) with white select 408. When A/C 407 equals one, exclusive OR gates 415 and 417 outputs clear either, CL1 or CL2 (pins three and eleven) of one shot 413, though not simultaneously. CLI is cleared at the trailing edge of white edge 401 (line 8, FIG. 7). This clear is not removed until the occurrence of the trailing edge of black edge 403 (line 9, FIG. 7). When CL1 is cleared, the Q1 output of one shot 413, white edge 401, is forced low, preventing consecutive occurrences of white edge pulses. A converse holds for clear two.

The remaining resistors, capacitors, and power sources delineated in the schematic of FIG. 6 are included in VP 103 as is conventional in the art for the components utilized therein.

Although there has been described here and above in substantial detail a particular arrangement of an analog video processor circuit for the purpose of illustrating a manner in which the invention may be used to advantage, it will be appreciated that the invention is not limited thereto. Accordingly, any and all modifications, variations or equivalent arrangements thereof which may occur to those skilled in the art should be considered to be within the scope of the invention as defined in the appended claims.

What is claimed is:

1. An analog video processor (AVP) in combination with a charge coupled device (CCD) camera; servo motors for orientation control of said camera; a microcomputer ($\mu$C) which inputs and outputs from said servo motors and which provides a tracking gate pass signal, a background clamp signal, an add contrast signal, and a whie select signal; and a video monitor (VM), said AVP including a video preprocessor (VPP) providing a delayed vertical sync (DVS) signal and having inputs and outputs from said CCD camera and said $\mu$C, and outputting to said VM and having:

an automatic light control (ALC) circuit having inputs and outputs from said CCD camera;

an automatic gain control (AGC) circuit inputting from said CCD camera; and a display (DP) circuit outputting to said VM and inputting from said $\mu$C and said CCD camera, and a video processor (VP) which inputs from said AGC, said VPP, and said $\mu$C and which provides a tracker video output signal and which comprises:

a gradient processor (GP) circuit inputting from said AGC circuit and including:

an analog delay inputting said tracker video signal;

a first GP amplifier inputting from said analog delay and inputting said tracker video signal;

a GP amplifier/lowpass filter (LPF) inputting from said first GP amplifier;

a GP analog video switch (GPAVS) inputting from said GP amplifier/LPF;

a GP current amplifier inputting from said GPAVS;

a positive/maximum peak detector inputting from said GP current amplifier;

a negative/minimum peak detector inputting from said GP current amplifier;

a GP quad analog SPST switch inputting from said positive and negative peak detectors and switched by said DVS;

a first GP buffer inputting from said positive peak detector through said GP quad analog switch;

a second GP buffer inputting from said negative peak detector through said GP quad analog switch;

a third GP buffer inputting from said first GP buffer;

a fourth GP buffer coupled inputting from said second GP buffer;

a first GP comparator inputting from said GP current amplifier and said third GP buffer; and a second GP comparator inputting from said GP current amplifier and said fourth GP buffer, a contrast processor (CP) circuit inputting from said AGC circuit and including:

a CP analog video switch (CPAVS) switched by said background clamp signal;

a CP sample and hold buffer inputting said tracker video signal through said CPAVS;

a CP difference amplifier/LPF inputting from said CP sample and hold buffer and inputting said tracker video signal;

a contrast threshold adjustment (CTA);

a CP inverter/LPF inputting from said CTA;

a first CP comparator inputting from said CP difference amplifier and said CTA; and a second CP comparator inputting from said CP difference amplifier and said CP inverter, an output control (OC) circuit inputting from said GP circuit, inputting from said CP circuit, inputting said add contrast signal and said white select signal, and outputting and inputting from said $\mu$C and including:

a first exclusive OR gate having said white select signal as one input;

a first OC NAND gate having one input from said first exclusive OR gate and having said add contrast signal as another input;

a second exclusive OR gate having said white select signal as one input;

a second OC NAND gate having one input from said second exclusive OR gate and having said add contrast signal as another input;

a dual one shot inputting from said first and second OC NAND gates;

a third OC NAND gate inputting from said one shot;

an OC JK flip flop inputting from said third OC NAND gate, having complemented outputs to said first and second exclusive OR gates, and inputting said tracking gate pass signal;

a first OC inverter inputting from said first CP comparator;

a second OC inverter inputting from said second CP comparator; and a dual four to one multiplexer inputting from said first and second OC inverters, inputting from said first and second CP comparators, inputting said add contrast and said white select signals, and outputting to said one shot.

* * * * *